United States Patent [19]

Johnson

[11] Patent Number: 4,969,287

[45] Date of Patent: Nov. 13, 1990

[54] RATTLING WORM WEIGHT

[76] Inventor: Troy M. Johnson, 909 NE. 29th St., Belle Glade, Fla. 33430

[21] Appl. No.: 425,871

[22] Filed: Oct. 24, 1989

[51] Int. Cl.$^5$ ............................................. A01K 85/00
[52] U.S. Cl. .................................. 43/42.31; 43/42.24; 43/44.8
[58] Field of Search ................. 43/42.24, 42.31, 42.39, 43/44.8, 44.83, 44.9

[56] References Cited

U.S. PATENT DOCUMENTS

| | | | |
|---|---|---|---|
| 3,352,051 | 11/1967 | Stewart | 43/44.8 |
| 3,465,466 | 9/1969 | Showalter | 43/44.8 |
| 3,466,787 | 9/1969 | Collins . | |
| 3,724,116 | 4/1973 | Lindor | 43/44.83 |
| 3,736,690 | 6/1973 | Witkowski . | |
| 3,848,353 | 11/1974 | McClellan . | |
| 3,905,147 | 9/1977 | Snipes . | |
| 3,935,660 | 2/1976 | Plew | 43/42.24 |
| 4,008,539 | 2/1977 | Gardner . | |
| 4,167,076 | 9/1979 | Weaver | 43/42.24 |
| 4,334,381 | 6/1982 | Carver | 43/44.8 |
| 4,367,607 | 1/1983 | Hedman | 43/44.8 |
| 4,703,579 | 11/1987 | Kay | 43/42.24 |
| 4,744,169 | 5/1988 | Nochta | 43/42.24 |
| 4,785,569 | 11/1988 | Thomas | 43/42.24 |

Primary Examiner—Kurt Rowan
Attorney, Agent, or Firm—Fleit, Jacobson, Cohn, Price, Holman & Stern

[57] ABSTRACT

A bullet-type slip weight is provided including a forward end portion defining a cavity therein double fluid tight sealed from the exterior of the weight and in which a plurality of loose rattle members are loosely received. The weight incorporates a tubular plastic body and a central longitudinal plastic tube portion extending longitudinally therethrough to define an annular cavity within the plastic body about the central tube portion. The rear end of the cavity is occupied by a tubular weight body snugly telescoped thereinto and the rear end of the cavity is closed by an annular rear closure wall sealed relative to the outer periphery of the rear end of the body and the rear end of the tube portion. The forward portion of the cavity disposed forward of the weight body has the aforementioned rattle members loosely received therein.

10 Claims, 1 Drawing Sheet

RATTLING WORM WEIGHT

BACKGROUND OF THE INVENTION

1. Field of the Invention

This invention relates to a fishing weight of the centrally bored, bullet-type and wherein the nose portion of the bullet weight defines a central cavity in which a plurality of rattle members are loosely received.

2. Description of Related Art

Various different forms of fishing line weights, fishing lures and fishing line dynamic depressors including some of the structural and operational features of the instant invention are disclosed in U.S. Pat. Nos. 3,466,787, 3,736,690, 3,848,353, 3,905,147, and 4,008,539. However, even though some of these fishing line sinkers or weights are of the "slip" type and include interior loose rattle members for noise making purposes, these prior known devices do not include the overall combination of structural features incorporated in the instant invention, which combination of features greatly simplifies the manufacture and expense of the rattling weight and further ensures waterproof construction of the weight against the entrance of water thereinto.

SUMMARY OF THE INVENTION

The slip weight of the instant invention is constructed in form of a bullet weight and includes a water tight interior cavity loosely receiving a plurality of rattle members therein. The interior cavity is double sealed against the entrance of water thereinto and the construction of the slip weight is such to enable mass production thereof at a low cost.

The main object of this invention is to provide a slip weight defining a fishing line receiving bore centrally therethrough and including rattle means for noise making purposes.

Another object of this invention is to provide a slip weight in accordance with the preceding object and constructed in a manner whereby the rattle means incorporates an interior cavity within the slip weight having a plurality of loose rattle members therein.

Yet another object of this invention is to provide a slip weight in accordance with the preceding objects and wherein the interior cavity defined thereby is double sealed against the entrance of water thereinto.

Still another important object of this invention is to provide a slip weight of the rattling type which may used in various different types of fishing.

A final object of this invention to be specifically enumerated herein is to provide a slip weight in accordance with the preceding objects and which will conform to conventional forms of manufacture, be of simple construction and easy to use so as to provide a device that will be economically feasible, long-lasting and relatively trouble free in operation.

These together with objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
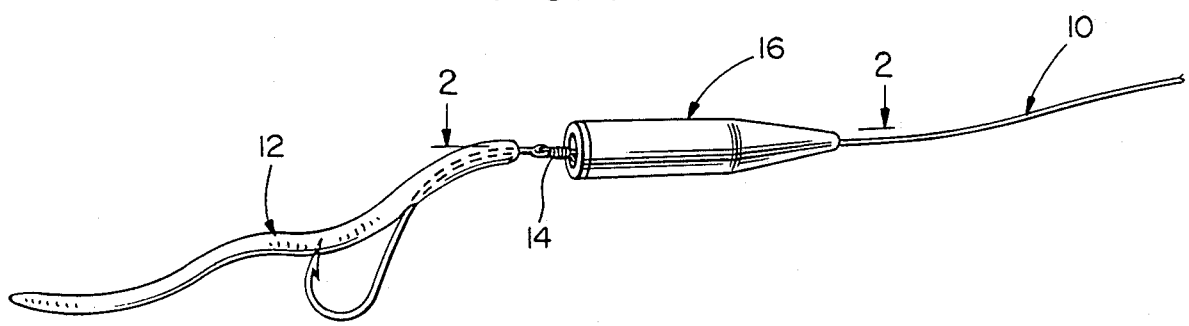
FIG. 1 is a perspective of view of the rattling slip weight of the instant invention in operative association with a fishing line and an attached Texas rigged plastic worm.

Referring now more specifically to the drawings the numeral 10 generally designates a fishing line on whose free end a Texas rigged hook and worm combination referred to in general by the reference numeral 12 is tied as at 14. In addition the fishing line 10 has a slip weight 16 constructed in accordance with the present invention disposed thereon forward of the tie 14.

Figure 2:
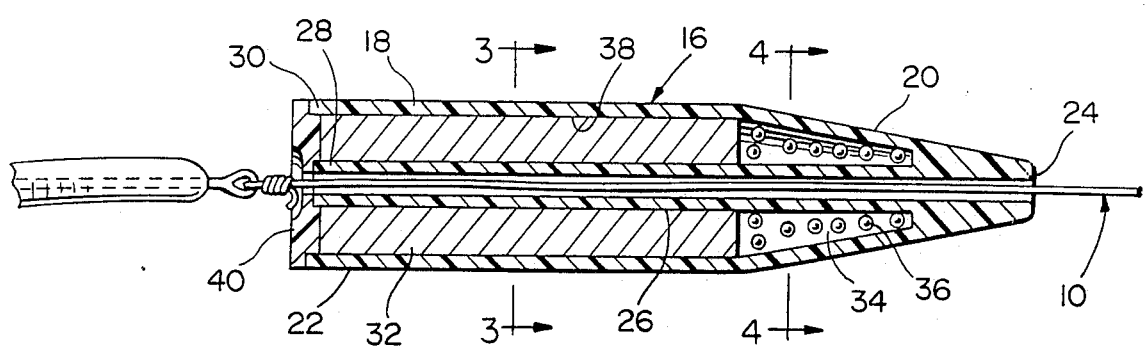
FIG. 2 is an enlarged fragmentary horizontal sectional view taken substantially upon the plane indicated by the section line 2—2 of FIG. 1.
Figure 3:
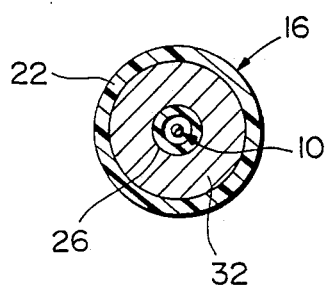
FIG. 3 is a transverse vertical sectional view taken substantially upon the plane indicated by the section line 3—3 of FIG. 2.
Figure 4:
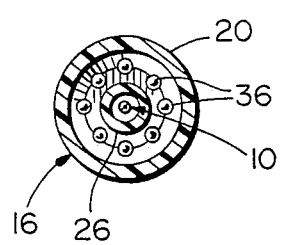
FIG. 4 is a transverse vertical sectional view taken substantially upon the plane indicated by the section line 4—4 of FIG. 2.
Figure 5:
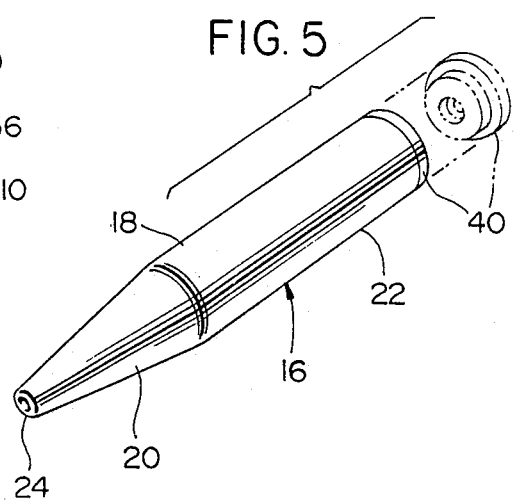
FIG. 5 is an enlarged perspective view of the weight with an exploded position of the rear end closure therefore illustrated in phantom lines.

With reference now more specifically to FIGS. 2, 3 and 4, the slip weight 16 includes a tubular body 18 having front and rear end portions 20 and 22. The rear end portion 22 is substantially cylindrical in configuration and thus of substantially constant cross sectional size and shape throughout the length thereof and the front end portion 20 is frusto conical in shape and tapers forwardly toward its forward terminal end 24.

The body 18 additionally includes a central longitudinal tube portion 26 disposed therein opening through and formed integrally with the forward terminal end 24, the rear end 28 of the tube portion 26 terminating rearwardly a spaced distance inward of the rear open end 30 of the rear end portion 22 of the body 18.

A tubular weight body 32 of substantially cylindrical configuration is snugly telescoped into the rear end portion 22 and over the rear portion of the tube portion 26. The forward end of the weight body 32 terminates at the juncture between the forward end of the rear end portion 22 and the rear end of forward end portion 20, thus leaving a space 34 of predetermined volume within the forward end portion 20 of the tubular body 18 about the tube portion 26. The space 34 has a plurality of spherical rattle members 36 loosely disposed therein, the aggregate volume of the rattle members 36 being appreciably smaller than the volume of the space 34 whereby the rattle members 36 are free to rattle against each other within the space 34 and against the wall portions of the forward end portion 20.

Of course, the rattle members 36 are disposed within the interior of the forward end portion 20 about the tube portion 26 before the weight body 32 is snugly telescoped into the annular cavity 38 disposed within the rear end portion 22 of the body 18 about the tube portion 26. The weight body 32 is snugly received within the cavity 38 and over the tube portion 26 in a manner sealingly closing the space 34 against the entrance of water thereinto from the rear end of the rear end portion 22 and, thereafter, an annular end wall 40 is sealingly secured over the rear end 30 of rear end portion 22 as well as the rear end 28 of the tube portion 26 to thereby form a second fluid tight seal against the entrance of water into the tubular body and thereafter into the space 34.

The weight 16 slidingly receives the fishing line 10 therethrough and thus may be utilized as a slip sinker, or the weight 16 may be staked or otherwise secured relative to fishing 10, as desired, in order to prevent the weight 16 from sliding along the fishing line 10.

By providing the weight 16, a fishing person occasionally may "flip" the tip of his or her rod in order to apply a jerk to the line 10 and thus cause the rattle members 36 to rattle. Further, although the weight 16 has been illustrated in conjunction with a Texas rigged hook and worm combination 12, it is to be noted that the weight 16 may be used in conjunction with other fishing lures if desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A rattling worm weight including a tubular body having front and rear end portions, said rear end portion being of substantially constant cross sectional size and shape throughout the length thereof and said front end portion tapering in cross sectional size toward the forward terminal end thereof, said tubular body including a central longitudinal tube portion extending longitudinally therethrough, opening at its forward end through said forward terminal end and opening rearwardly at its rear end adjacent the rear terminal end of said rear end portion, a constant cross sectional size and shape tubular weight body snugly telescoped into said rear end portion and over said tube portion, a plurality of loose rattle members disposed within said front end portion forward of said weight body and about said tube portion with the aggregate volume of said rattle members being sufficiently less than the interior volume of said front end portion forward of said weight body and about said tube portion such that said rattle members are loosely received in said front end portion and may shift relative to each other therein in order to "rattle", and a centrally apertured closure end wall sealingly secured relative to and closing the rear end of said rear end portion rearward of said weight body and also sealingly secured relative to the rear end of said tube portion.

2. The rattling worm weight of claim 1 wherein said tubular body rear end portion is circular in cross sectional shape.

3. The rattling worm weight of claim 2 wherein said tubular body forward end portion is circular in cross sectional shape.

4. The rattling worm weight of claim 3 wherein said central longitudinal tube portion is circular in cross sectional shape.

5. The rattling worm weight of claim 4 wherein said rattle members are substantially spherical in shape.

6. The rattling worm weight of claim 1 wherein said body and tube portion are integrally formed.

7. The worm weight of claim 6 wherein said body and tube portion are constructed of plastic.

8. The rattling worm weight of claim 1 wherein the forward tapering of the internal surfaces of said front end portion defines abutment surface means limiting forward shifting of said weight body relative to said tubular body and thereby establishes a minimum interior volume of said front end portion, exteriorly of said tube portion, in which to loosely receive said rattle members of said aggregate volume less than said minimum interior volume.

9. A rattling worm weight including a tubular body having front and rear end portions, said rear end portion being of substantially constant cross sectional size and shape throughout the length thereof and said front end portion being of reduced average cross sectional size, said tubular body including a central longitudinal tube portion extending longitudinally therethrough opening, at its forward end through the forward terminal end of said front end portion and opening rearwardly at its rear end adjacent the rear terminal end of said rear end portion, a constant cross sectional size and shape tubular weight body snugly telescoped into said rear end portion and over said tube portion, a plurality of loose rattle members disposed within said front end portion forward of said weight body and about said tube portion with the aggregate volume of said rattle member sufficiently less than the interior volume of said front end portion forward of said weight body and about said tube portion such that said rattle members are loosely received in said front end portion and may shift relative to the each other therein in order to rattle, a centrally apertured closure end wall sealingly secured relative to and closing the rear end of said rear end portion rearward of said weight body and also sealingly secured relative to the rear end of said tube portion, the reduced cross sectional size of the internal surfaces of said front end portion defining abutment surface means engagable by and limiting forward shifting of said weight body and said tubular body and thereby establishing a minimum interior volume of said front end portion, exteriorly of said tubular portion, in which to receive said rattle members of said aggregate volume less than said minimum interior volume.

10. A rattling worm weight including a tubular body having front and rear end portions, said rear end portion being of substantially constant cross sectional size and shape throughout the length thereof and said front end portion being of reduced average cross sectional size, said tubular body including a central longitudinal tube portion extending longitudinally therethrough opening, and its forward end, through the forward terminal end of said front end portion and opening, rearwardly and its rear end, adjacent the rear terminal end of said rear end portion, a tubular weight body snugly telescoped into one of said end portions and over said tube portion, a plurality of loose rattle members disposed within the other end portion of said tubular body and about said tube portion with the aggregate volume of said rattle members being sufficiently less than the interior volume of said other end portion of said tubular body about said tube portion such that said rattle members are loosely received in said other end portion and may shift relative to each other therein in order to rattle, a centrally apertured closed end wall sealingly secured relative to and closing the rear end of said rear end portion of said tubular body and also sealingly secured relative to the rear end of said tube portion.

* * * * *